United States Patent
Lee et al.

(10) Patent No.: US 9,544,884 B2
(45) Date of Patent: Jan. 10, 2017

(54) METHOD FOR CONFIGURING RESOURCE BLOCK FOR SEARCH REGION OF DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 14/390,364

(22) PCT Filed: Apr. 24, 2013

(86) PCT No.: PCT/KR2013/003526
§ 371 (c)(1),
(2) Date: Oct. 2, 2014

(87) PCT Pub. No.: WO2013/162287
PCT Pub. Date: Oct. 31, 2013

(65) Prior Publication Data
US 2015/0110026 A1    Apr. 23, 2015

Related U.S. Application Data

(60) Provisional application No. 61/637,835, filed on Apr. 24, 2012, provisional application No. 61/760,036, filed on Feb. 2, 2013.

(51) Int. Cl.
*H04W 72/04* (2009.01)
*H04B 7/26* (2006.01)
(Continued)

(52) U.S. Cl.
CPC ....... *H04W 72/0413* (2013.01); *H04B 7/2656* (2013.01); *H04L 1/1812* (2013.01);
(Continued)

(58) Field of Classification Search
CPC .... H04L 5/0005; H04L 5/0007; H04L 5/0053; H04L 5/0055; H04L 1/1812; H04L 1/1893; H04W 72/0413; H04W 72/0453; H04W 72/1278; H04B 7/2656
(Continued)

(56) References Cited

U.S. PATENT DOCUMENTS 8,606,287 B2 * 12/2013 Landau ................ H04L 1/0026
370/329
9,240,852 B2 *  1/2016 Yang ....................... H04L 5/001
(Continued)

FOREIGN PATENT DOCUMENTS

CN    1965513    5/2007
CN    102415132    4/2012
(Continued)

OTHER PUBLICATIONS

PCT International Application No. PCT/KR2013/003526, Written Opinion of the International Searching Authority dated Aug. 9, 2013, 26 pages.
(Continued)

*Primary Examiner* — Tri H Phan
(74) *Attorney, Agent, or Firm* — Lee Hong Degerman Kang Waimey

(57) ABSTRACT

The present invention relates to a method and apparatus for transmitting uplink data using a hybrid automatic repeat request (HARQ) by a terminal in a wireless communication system. More particularly, the method disclosed in the present invention comprises the steps of: establishing a first uplink-downlink configuration for a first frequency band and
(Continued)

establishing a second uplink-downlink configuration for a second frequency band; receiving uplink control information in a downlink subframe on the first frequency band; and transmitting uplink data corresponding to the uplink control information in a specific uplink subframe linked to the downlink subframe on the basis of the first uplink-downlink configuration and second uplink-downlink configuration.

13 Claims, 15 Drawing Sheets

(51) Int. Cl.
  *H04L 5/00* (2006.01)
  *H04L 1/18* (2006.01)
(52) U.S. Cl.
  CPC .......... *H04L 1/1893* (2013.01); *H04L 5/0007* (2013.01); *H04L 5/0053* (2013.01); *H04L 5/0055* (2013.01); *H04W 72/0453* (2013.01)
(58) Field of Classification Search
  USPC ................................ 370/254–258, 310–350, 431–439,370/464–465
  See application file for complete search history.

(56) References Cited

U.S. PATENT DOCUMENTS

| | | | | |
|---|---|---|---|---|
| 2012/0213170 A1* | 8/2012 | Choi | ..................... | H04L 1/1861 370/329 |
| 2013/0089068 A1* | 4/2013 | Kalhan | ............. | H04W 72/0446 370/330 |
| 2013/0194980 A1* | 8/2013 | Yin | ....................... | H04L 1/1854 370/280 |
| 2013/0208634 A1* | 8/2013 | Ji | ....................... | H04W 72/0406 370/280 |
| 2013/0242799 A1* | 9/2013 | Yin | ....................... | H04L 1/1861 370/254 |
| 2013/0265914 A1* | 10/2013 | Ahn | ..................... | H04B 7/2656 370/280 |
| 2014/0050107 A1* | 2/2014 | Charbit | ............. | H04W 72/1289 370/252 |
| 2014/0362746 A1* | 12/2014 | Yang | ..................... | H04L 1/1861 370/280 |
| 2015/0327225 A1* | 11/2015 | Xia | ....................... | H04W 28/06 370/329 |
| 2016/0212744 A1* | 7/2016 | Lyu | ................... | H04W 72/0406 |

FOREIGN PATENT DOCUMENTS

| | | |
|---|---|---|
| KR | 10-2011-0126034 | 11/2011 |
| KR | 10-2012-0035871 | 4/2012 |
| WO | 2011/159311 | 12/2011 |
| WO | 2011159311 | 12/2011 |

OTHER PUBLICATIONS

Alcatel-Lucent Shanghai Bell, et al., "Specification impact of Inter-band Carrier aggregation with different TDD UL-DL configurations," 3GPP TSG RAN WG1 Meeting #66bis, R1-113313, Oct. 2011, 3 pages.
Ericsson, et al., "Remaining PDSCH HARQ timing issues in aggregation of TDD carriers with different UL/DL configurations," 3GPP TSG-RAN WG1 #68bis, R1-121014, Mar. 2012, 4 pages.
PCT International Application No. PCT/KR2013/003526, Written Opinion of the International Searching Authority dated Aug. 9, 2013, 17 pages.
State Intellectual Property Office of the People's Republic of China Application Serial No. 201380021540.1, Office Action dated Nov. 1, 2016, 11 pages.
Ericsson et al., "Remaining PDSCH cross-carrier scheduling issues in aggregation of TDD carriers with different UL/DL configurations", R1-121013, 3GPP TSG-RAN WG1 #68bis, Mar. 2012, 3 pages.

* cited by examiner

FIG. 2
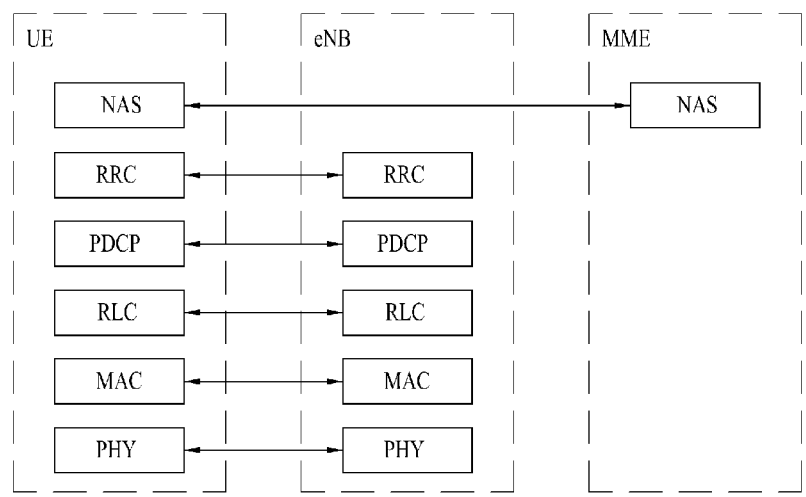
(a) CONTROL-PLANE PROTOCOL STACK
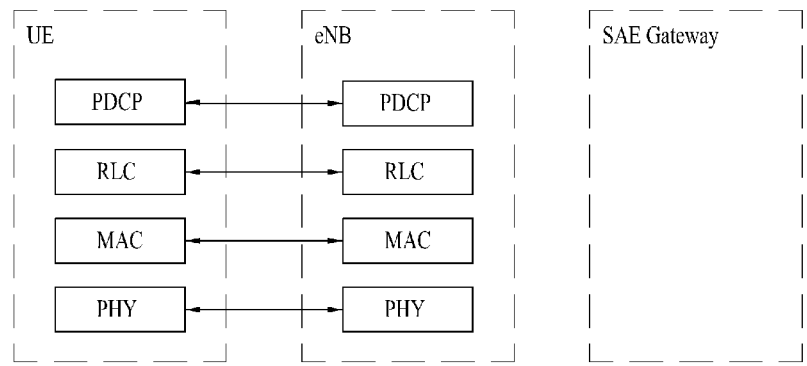
(b) USER-PLANE PROTOCOL STACK FIG. 14
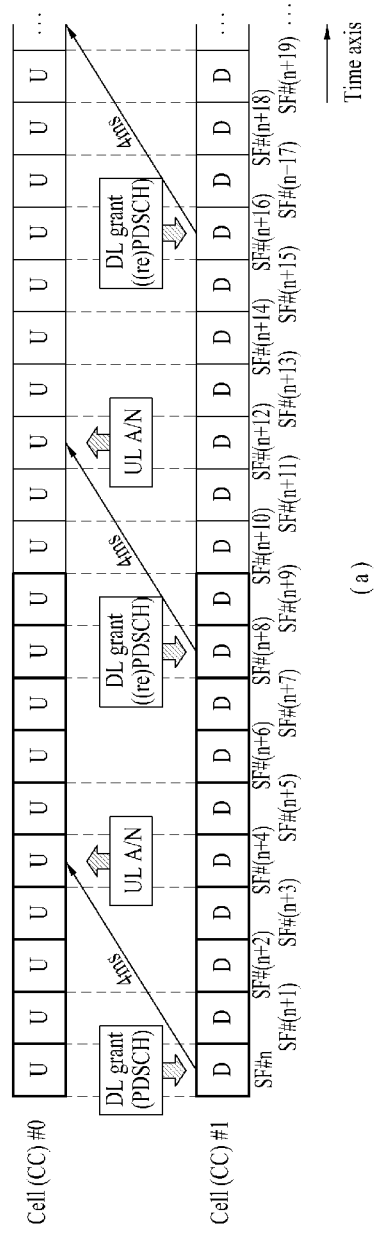
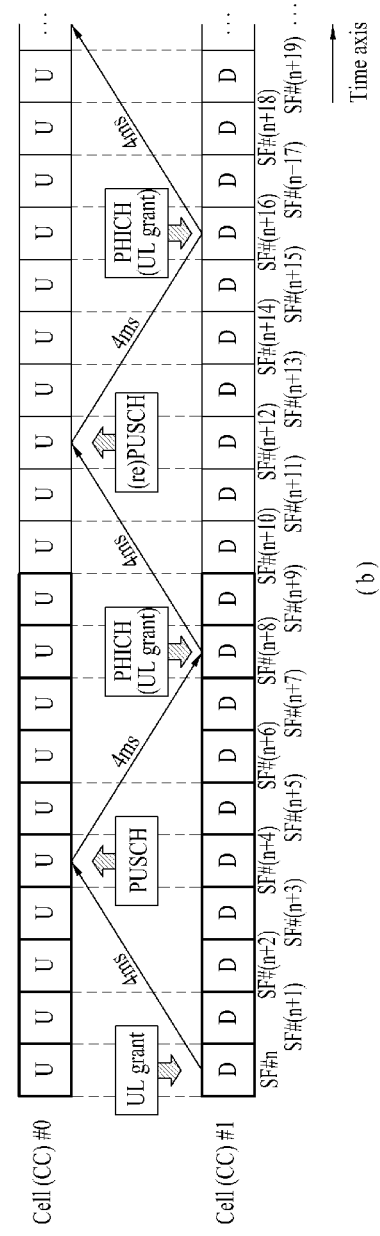

FIG. 15
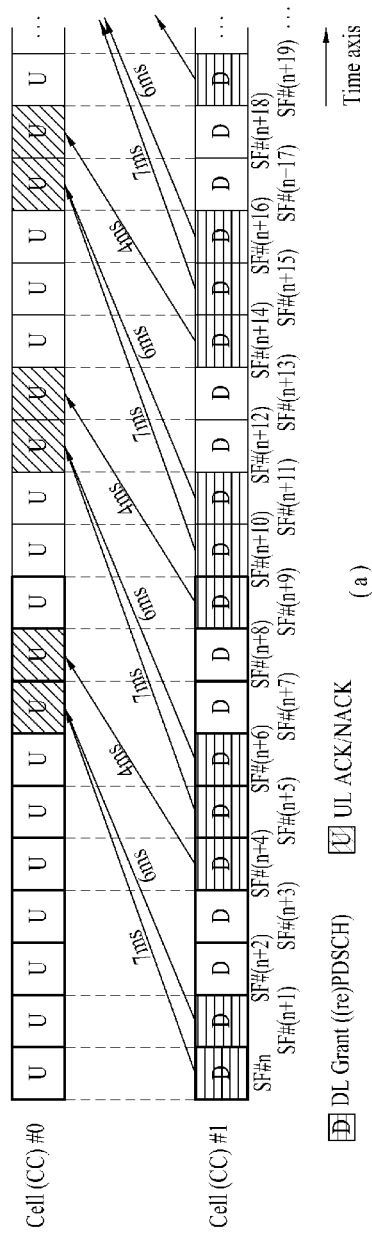
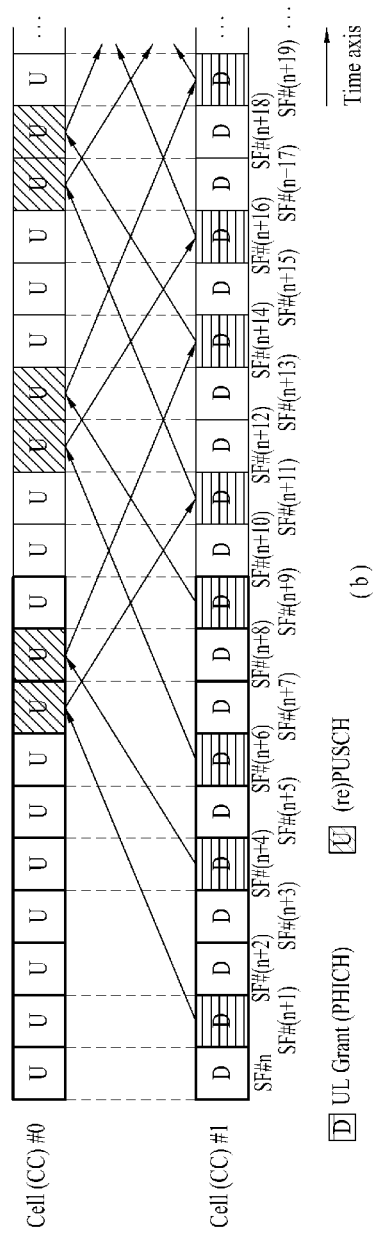

US 9,544,884 B2

METHOD FOR CONFIGURING RESOURCE BLOCK FOR SEARCH REGION OF DOWNLINK CONTROL CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2013/003526, filed on Apr. 24, 2013, which claims the benefit of U.S. Provisional Application Serial Nos. 61/637,835, filed on Apr. 24, 2012, and 61/760,036, filed on Feb. 2, 2013, the contents of which are all hereby incorporated by reference herein in their entirety.

TECHNICAL FIELD

The present invention relates to a wireless communication system, and more particularly, to a method and apparatus for dynamically allocating radio resources.

BACKGROUND ART

A description will be given of a 3rd Generation Partnership Project Long Term Evolution (3GPP LTE) system as an example of a wireless communication system to which the present invention is applicable.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called a Long Term Evolution (LTE) system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat and reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for dynamically allocating radio resources in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting uplink data using Hybrid Automatic Repeat and reQuest (HARQ) by a User Equipment (UE) in a wireless communication system includes setting a first Uplink-Downlink (UL-DL) configuration for a first frequency band and a second UL-DL configuration for a second frequency band, receiving uplink control information in a downlink subframe of the first frequency band, and transmitting uplink data corresponding to the uplink control information in a specific uplink subframe linked to the downlink subframe based on the first and second UL-DL configurations.

The specific uplink subframe may be the first uplink subframe a predetermined time after a reception time of the uplink control information among subframes of the first and second frequency bands.

The first and second frequency bands may be different on a single component carrier.

One of the first and second frequency bands may be a frequency band for uplink communication and the other frequency band may be a frequency band for downlink communication. A time offset may apply between the first and second UL-DL configurations. The time offset may be received by one of a physical layer signal, a higher layer signal, and a system information transmission channel.

The predetermined time may be 4 ms.

The method may further include receiving control information corresponding to the transmitted uplink data in a specific downlink subframe linked to the specific uplink subframe based on the first and second UL-DL configurations. The specific downlink subframe may be the first downlink subframe a predetermined time after a transmission time of the uplink data among subframes of the first and second frequency bands.

The method may further include receiving information related to transmission of the specific uplink subframe by a higher layer signal or a physical layer signal.

The first and second UL-DL configurations may be set to be valid only during a predetermined time interval. Information about the predetermined time interval may be received by a physical layer signal or a higher layer signal.

In another aspect of the present invention, a method for transmitting uplink data using HARQ by a UE in a wireless communication system includes configuring a first subcarrier for downlink communication and a second subcarrier for uplink communication, receiving uplink control information in a specific downlink subframe of the first subcarrier, and transmitting uplink data corresponding to the uplink control information in a specific uplink subframe of the second subcarrier. The specific downlink subframe and the specific uplink subframe are linked based on a predetermined UL-DL configuration.

In another aspect of the present invention, a method for transmitting a Sounding Reference Signal (SRS) by a UE in a wireless communication system includes configuring a downlink frequency band to include at least one special subframe, and transmitting an SRS in the at least one special subframe. The SRS is transmitted in an Uplink Pilot Time Slot (UpPTS) of the at least one special subframe.

In another aspect of the present invention, a UE for transmitting uplink data using HARQ in a wireless communication system includes a Radio Frequency (RF) unit, and a processor. The processor is configured to set a first UL-DL configuration for a first frequency band and a second UL-DL configuration for a second frequency band, receive uplink control information in a downlink subframe of the first frequency band, and transmit uplink data corresponding to the uplink control information in a specific uplink subframe linked to the downlink subframe based on the first and second UL-DL configurations.

Advantageous Effects

According to the present invention, as radio resources are dynamically changed according to Uplink/Downlink (UL/DL) system load in a radio resource allocation method in a wireless communication system, radio resource allocation is performed adaptively.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

FIGS. 14 and 15 illustrate UL/DL HARQ operations based on preset HARQ timelines according to the present invention;

BEST MODE FOR CARRYING OUT THE INVENTION

Figure 1:
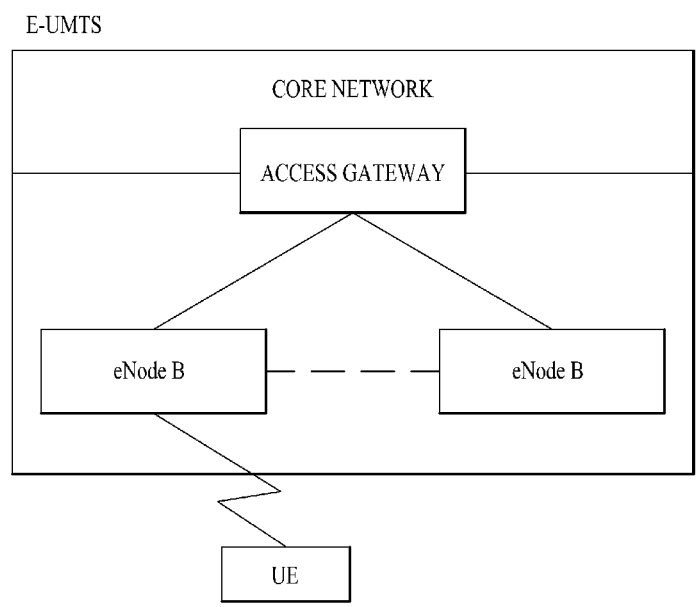
FIG. 1 illustrates a configuration of an Evolved Universal Mobile Telecommunications System (E-UMTS) network as an example of a wireless communication system.

Techniques as set forth herein may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP LTE/LTE-A system, this is purely exemplary and thus should not be constructed as limiting the present invention. Specific terms used in the embodiments of the present invention are provided to assist the understanding of the present invention and may be replaced with other terms within the technical scope of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an evolved Node B (eNB or eNode B) is set to one of bandwidths of 1.4, 3, 5, 10, 15, and 20 Mhz and provides a DL or UL service to a plurality of UEs. Different cells may be set to different bandwidths.

DL transport channels used to deliver data from the E-UTRAN to UEs include a Broadcast Channel (BCH) carrying system information, a Paging Channel (PCH) carrying a paging message, and a DL Shared Channel (DL-SCH) carrying user traffic or a control message. DL multicast traffic or control messages or DL broadcast traffic or control messages may be transmitted on the DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
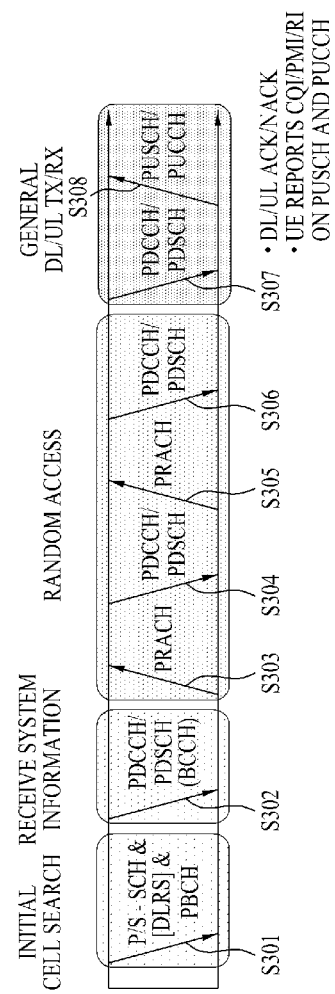
FIG. 3 illustrates physical channels and a general signal transmission method using the physical channels in a 3GPP Longer Term Evolution (LTE) system.

FIG. 3 illustrates physical channels and a general method for transmitting signals on the physical channels in the 3GPP LTE system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

To complete setup of a connection to the eNB, the UE may perform a random access procedure with the eNB (S303 to S306). In the random access procedure, the UE may transmit a predetermined sequence as a preamble on a Physical Random Access Channel (PRACH) (S303) and may receive a response message to the preamble on a PDCCH and a PDSCH associated with the PDCCH (S304). In the case of contention-based random access, the UE may additionally perform a contention resolution procedure including additional transmission of a PRACH (S305) and additional reception of a PDCCH and a PDSCH corresponding to the PDCCH (S306).

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Control information that the UE transmits to the eNB is collectively referred to as Uplink Control Information (UCI). The UCI includes a Hybrid Automatic Repeat and request (HARQ) ACKnowledgment/Negative ACKnowledgment (ACK/NACK), a Scheduling Request (SR), Channel State Information (CSI), etc. Herein, an HARQ ACK/NACK is shortly referred to as an HARQ-ACK or an ACK/NACK (A/N). An HARQ-ACK includes at least one of positive ACK (shortly, ACK), NACK, Discontinuous Reception (DRX), or NACK/DTX. The CSI includes a Channel Quality Indicator (CQI), a Precoding Matrix Index (PMI), a Rank Indication (RI), etc. Although UCI is transmitted periodically on a PUCCH, the UCI may be transmitted on a PUSCH when control information and traffic data should be transmitted at the same time. Also, the UCI may be transmitted aperiodically on a PUSCH upon request/instruction of a network.

Figure 4:
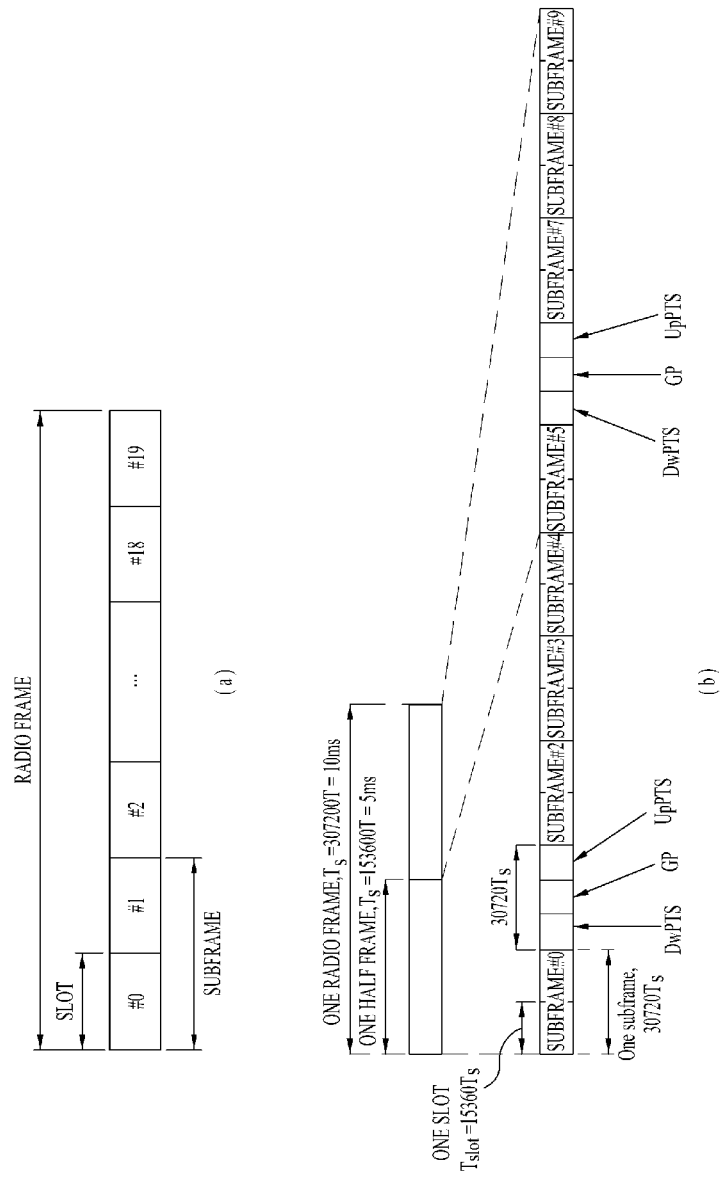
FIG. 4 illustrates a radio frame structure in the LTE system.

FIG. 4 illustrates a radio frame structure in the LTE system.

Referring to FIG. 4, in a cellular Orthogonal Frequency Division Multiplexing (OFDM) wireless packet communication system, UL/DL data packets are transmitted in subframes. One subframe is defined as a predetermined time interval including a plurality of OFDM symbols. The 3GPP LTE standards support a type 1 radio frame structure applicable to Frequency Division Duplex (FDD) and a type 2 radio frame structure applicable to Time Division Duplex (TDD).

FIG. 4($a$) is a diagram illustrating the structure of the type 1 radio frame. A DL radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA on DL, an OFDM symbol represents one symbol period. An OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of normal CP. In the case of extended CP, for example, one slot may include 6 OFDM symbols. If a channel state is instable as is the case with a fast UE, the extended CP may be used in order to further reduce inter-symbol interference.

In the case of normal CP, since one slot includes 7 OFDM symbols, one subframe includes 14 OFDM symbols. The first up to three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including 4 subframes each having 2 slots and a special subframe having a Downlink Pilot Time Slot (DwPTS), a Guard Period (GP), and an Uplink Pilot Time Slot (UpPTS).

In the special subframe, DwPTS is used for initial cell search, synchronization, or channel estimation at a UE. UpPTS is used for an eNB to perform channel estimation and acquire UL synchronization with a UE. In other words, DwPTS is used for DL transmission, and UpPTS is used for UL transmission. Particularly, UpPTS is used for transmitting a PRACH preamble or a Sounding Reference Signal (SRS). The GP is used to cancel UL interference between UL and DL, caused by the multi-path delay of a DL signal.

A current 3GPP standard specification defines the following configurations listed in [Table 1] below for the special subframe. [Table 1] illustrates DwPTSs and UpPTSs in the case where $T_s=1/(15000\times 2048)$. The remaining region except for a DwPTS and an UpPTS is set as a GP.

UL/DL subframe configurations for the type 2 radio frame, that is, for a TDD system are listed in [Table 2] below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2], D represents a DL subframe, U represents a UL subframe, and S represents a special subframe. [Table 2] further tabulates DL-to-UL switching periodicities for the respective UL/DL subframe configurations in each system.

The above-described structures of radio frames are purely exemplary. Accordingly, the number of subframes in a radio frame, the number of slots in a subframe, or the number of symbols in a slot may be changed in various manners.

Figure 5:
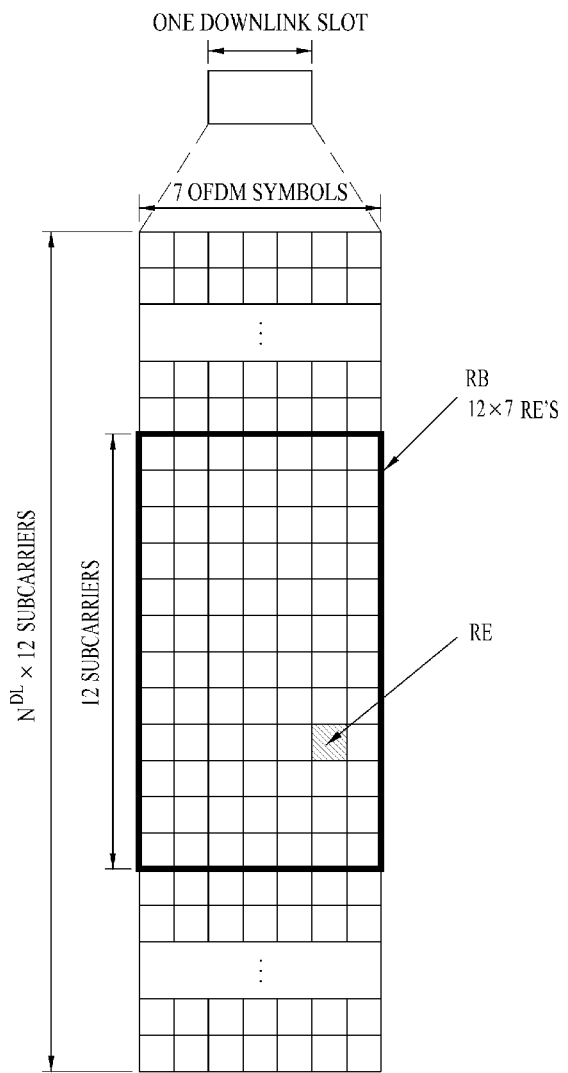
FIG. 5 illustrates a structure of a Downlink (DL) resource grid for the duration of one DL slot.

FIG. 5 illustrates the structure of a DL resource grid for the duration of one DL slot.

Referring to FIG. 5, a DL slot includes $N_{symb}^{DL}$ OFDM symbols in the time domain by $N_{RB}^{DL}$ RBs in the frequency domain. Since each RB includes $N_{sc}^{RB}$ subcarriers, the DL slot includes $N_{RB}^{DL} \times N_{sc}^{RB}$ in the frequency domain. While a DL slot includes 7 OFDM symbols and an RB includes 12 subcarriers in the illustrated case of FIG. 5, this is purely exemplary and should not be construed as limiting the present invention. For example, the number of OFDM symbols included in a DL slot may be changed according to the length of a CP.

Each element of a resource grid for each antenna port is called a Resource Element (RE) identified by an OFDM symbol index and a subcarrier index. One RB includes $N_{symb}^{DL} \times N_{sc}^{RB}$ REs. The number $N_{RB}^{DL}$ of RBs included in a DL slot depends on a DL transmission bandwidth set in a cell.

Figure 6:
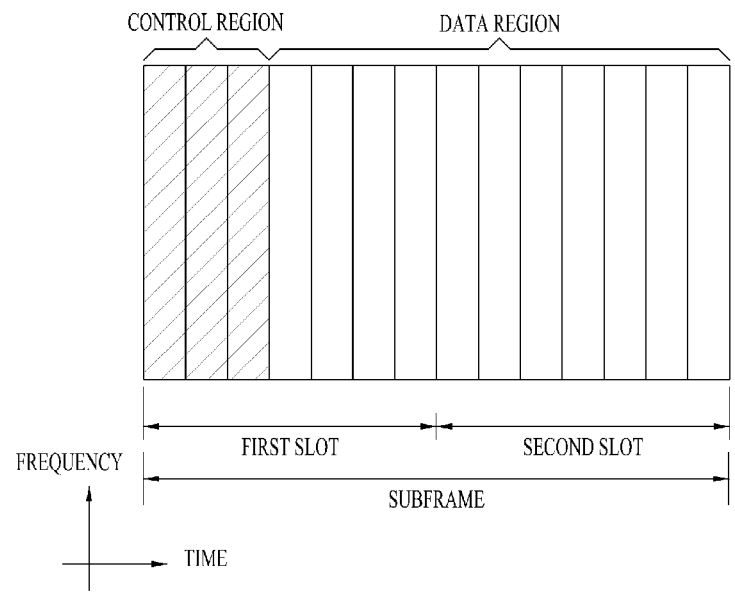
FIG. 6 illustrates a structure of a DL subframe.

FIG. 6 illustrates a structure of a DL subframe.

Referring to FIG. 6, up to 3 (or 4) OFDM symbols at the start of the first slot of a DL subframe are used as a control region to which control channels are allocated and the remaining OFDM symbols of the DL subframe are used as

TABLE 1

| | | Normal cyclic prefix in downlink | | | Extended cyclic prefix In downlink | | |
|---|---|---|---|---|---|---|---|
| | | UpPTS | | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | a data region to which a PDSCH is allocated. DL control channels defined for the 3GPP LTE system include a Physical Control Format Indicator Channel (PCFICH), a PDCCH, a Physical Hybrid automatic repeat request (ARQ) Indicator Channel (PHICH), etc. The PCFICH is located in the first OFDM symbol of a subframe, carrying information about the number of OFDM symbols used for transmission of control channels in the subframe. The PHICH delivers an HARQ ACK/NACK signal as a response to a UL transmission.

Control information carried on the PDCCH is called Downlink Control Information (DCI). The DCI transports resource allocation information and other information for a UE or a UE group. For example, the DCI includes UL/DL scheduling information, a UL transmission power control command, etc.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a transmission power control command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the number of CCEs. An eNB determines a PDCCH format according to DCI to be transmitted to a UE and adds a Cyclic Redundancy Check (CRC) to control information. The CRC is masked by an ID known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by an SI-RNTI. If the PDCCH is for a random access response, the CRC of the PDCCH may be masked by a Random Access-RNTI (RA-RNTI).

Figure 7:
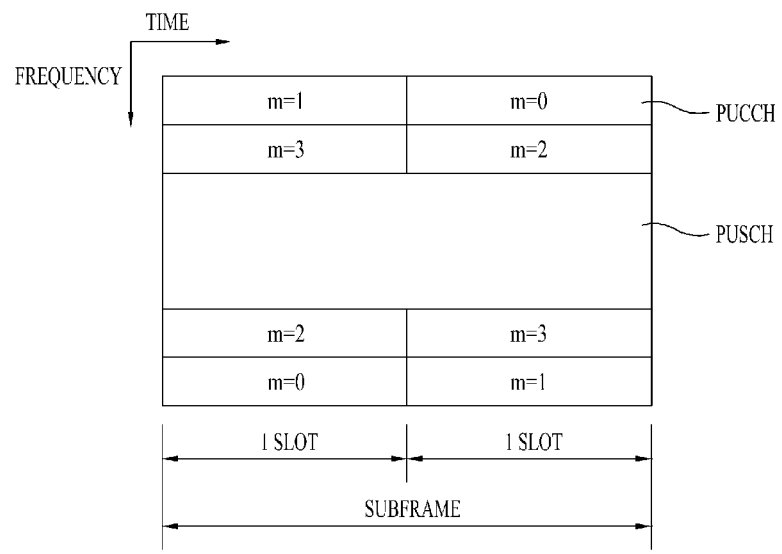
FIG. 7 illustrates a structure of an Uplink (UL) subframe in the LTE system.

FIG. 7 illustrates a structure of a UL subframe in the LTE system.

Referring to FIG. 7, a UL subframe includes a plurality of slots (e.g. 2 slots). Each slot may include a different number of SC-FDMA symbols according to a CP length. The UL subframe is divided into a control region and a data region in the frequency domain. A PUSCH carrying a data signal such as voice or the like is transmitted in the data region, and a PUCCH carrying UCI is transmitted in the control region. The PUCCH includes an RB pair located at both ends of the data region along the frequency axis and hops over a slot boundary.

The PUCCH may carry the following control information.
SR: information used to request UL-SCH resources. The SR is transmitted in On-Off Keying (OOK).
HARQ ACK/NACK: a response signal to a DL data packet on a PDSCH. The HARQ ACK/NACK indicates whether the DL data packet has been received successfully. A 1-bit ACK/NACK is transmitted as a response to a single DL codeword and a 2-bit ACK/NACK is transmitted as a response to two DL codewords.
CSI: feedback information for a DL channel. The CSI includes a CQI and Multiple Input Multiple Output (MIMO) feedback information includes an RI, a PMI, a Precoding Type Indicator (PTI), etc. 20 bits per subframe are used.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH.

Now a description will be given of HARQ in a wireless communication system.

If there are a plurality of UEs that will receive DL data from an eNB or transmit UL data to the eNB in a wireless communication system, the eNB selects a UE for data transmission in every TTI (e.g. subframe). Particularly, the eNB selects UEs for transmission of UL/DL data in each TTI and also selects a frequency band that each UE will use for data transmission in a multi-carrier system or a similar system.

This will be described in the context of UL. UEs transmit RSs (or pilot signals) on UL. The eNB determines channel states of the UEs based on the received RSs and selects a UE that will transmit UL data in each unit frequency band in every TTI. The eNB indicates the result to the UE. That is, the eNB transmits to the UL-scheduled UE a UL assignment message instructing data transmission in a specific frequency band during a specific TTI. The UL assignment message is also called a UL grant. The UE transmits UL data to the eNB according to the UL assignment message. The UL assignment message basically includes a UE ID, RB allocation information, payload, etc. and may further include an Incremental Redundancy (IR) version, a New Data Indication (NDI), etc.

In synchronous non-adaptive HARQ, when a UE scheduled for a specific time retransmits data, a retransmission time is set for the UE by the system (e.g. 4 subframes after reception of a NACK signal). Accordingly, the eNB needs to transmit a UL grant message to the UE only for an initial transmission and transmits an ACK/NACK signal for a subsequent retransmission. On the other hand, since a retransmission time is not preset between a UE and an eNB in asynchronous adaptive HARQ, the eNB should transmit a retransmission request message to the UE. Since frequency resources or a Modulation and Coding Scheme (MCS) for a retransmission is changed at each transmission time, the eNB should transmit an HARQ process index, an IR version, and NDI information in addition to a UE ID, RB allocation information, and payload, when transmitting the retransmission request message.

Figure 8:
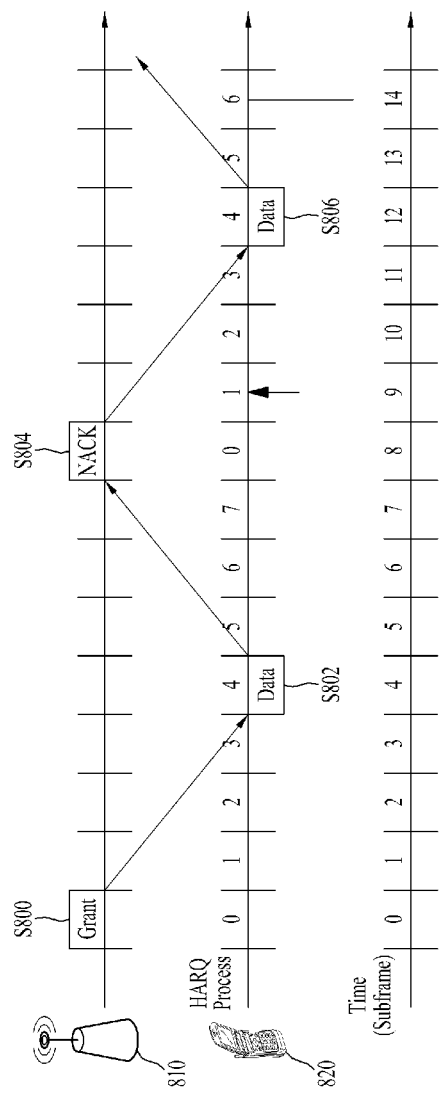
FIG. 8 illustrates a UL Hybrid Automatic Repeat and reQuest (HARQ) operation in the LTE system.

FIG. 8 illustrates a UL HARQ operation in the LTE system. The LTE system uses synchronous non-adaptive HARQ as a UL HARQ scheme. In the case of 8-channel HARQ, HARQ processes are numbered from 0 to 7. One HARQ process operates per TTI (e.g. per subframe). Referring to FIG. 8, an eNB 810 transmits a UL grant to a UE 820 on a PDCCH (S800). The UE 820 transmits UL data to the eNB 810 4 subframes (e.g., in subframe 4) after the reception time of the UL grant (e.g. subframe 0) using RBs and an MCS indicated by the UL grant (S802). The eNB 810 decodes the UL data received from the UE 820 and then generates an ACK/NACK. If the decoding of the UL data is failed, the eNB 810 transmits a NACK to the UE 820 (S804). The UE 820 retransmits the UL data 4 subframes after the reception time of the NACK (S806). Herein, the same HARQ processor (e.g. HARQ process 4) is responsible for the initial transmission and retransmission of the UL data.

A DL/UL HARQ operation in an FDD system will be described below.

Figure 9:
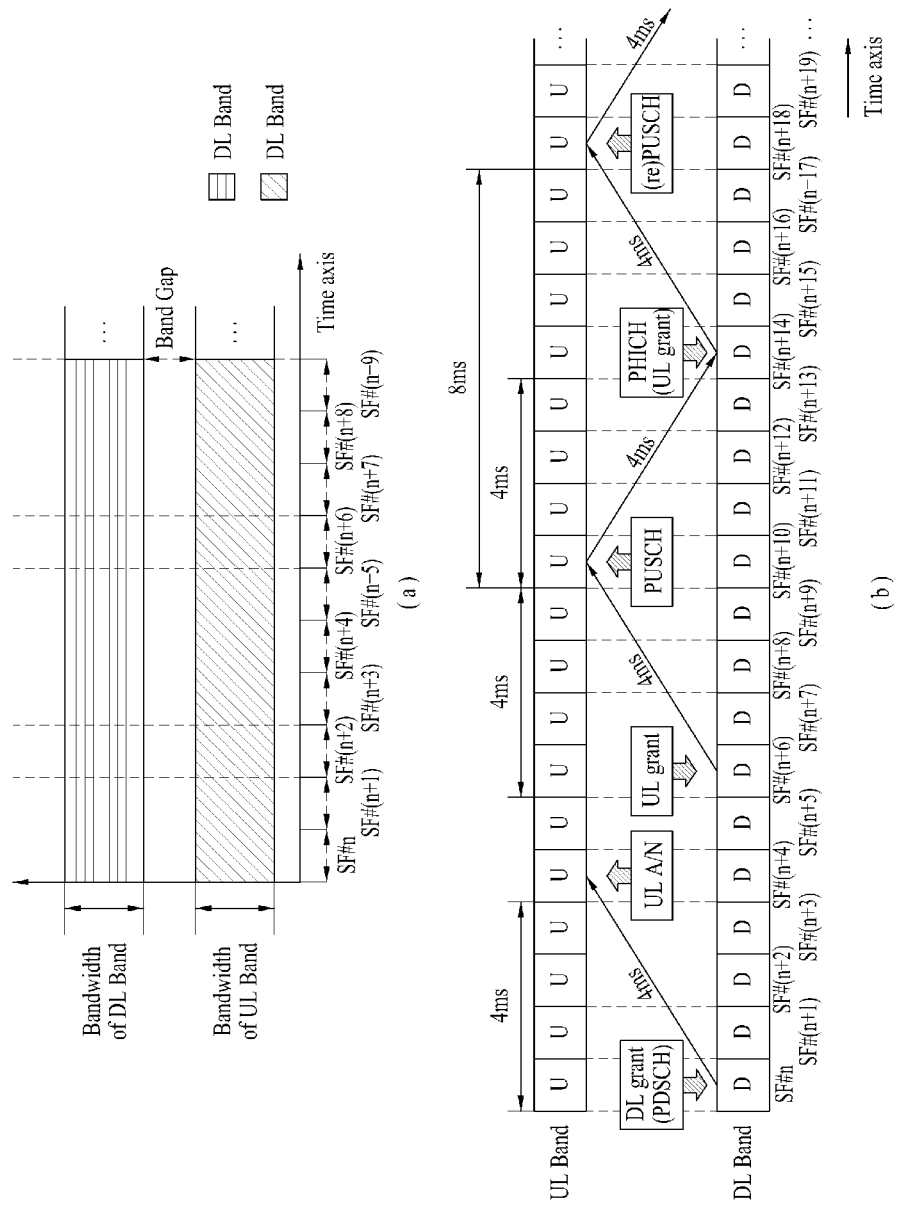
FIG. 9 illustrates a Frequency Division Duplex (FDD) system and its DL/UL HARQ timeline.

FIG. 9 illustrates an FDD system and its DL/UL HARQ timeline. As illustrated in FIG. 9(*a*), transmission/reception of DL/UL data corresponding to specific UL/DL data occurs 4 ms later in the FDD system. Referring to FIG. 9(*b*), a UL ACK/NACK for a PDSCH/DL grant is transmitted 4 ms after a reception time of the PDSCH/DL grant. A PUSCH corresponding to a UL grant/PHICH is transmitted 4 ms after a reception time of the UL grant/PHICH, and a PHICH/UL grant corresponding to a PUSCH transmission/retransmission is received 4 ms after a time of the PUSCH transmission/retransmission.

The 3GPP LTE system uses synchronous HARQ for a UL HARQ operation and asynchronous HARQ for a DL HARQ operation. If an initial transmission is failed, a retransmission takes place at a time set by the system in synchronous HARQ. That is, a time for a UL data transmission/retransmission associated with a specific HARQ process or a time related to a UL grant/PHICH timeline is preset, not subject to arbitrary change. On the contrary, a retransmission of data failed at an initial transmission may be performed at a time 8 ms later, including an initial transmission time, in asynchronous HARQ. However, along with the development of wireless communication systems, the system overhead of UL or DL communication has been increased. Accordingly, there is an increasing need for dynamically changing the usage of a specific band.

In this context, the present invention provides a method for efficiently using a specific band for DL or UL transmission by changing the usage of the specific band used in a wireless communication system in terms of a time resource area.

That is, the present invention provides a method for using a specific band of a legacy FDD system in a manner that minimizes effects on a DL/UL HARQ timeline of the legacy FDD system or maximizes the utilization of a UL/DL HARQ process.

According to the present invention, since bi-directional communication, that is, UL/DL communication is possible in a specific band, channel reciprocity may be used effectively for channel estimation in an FDD system. For example, a UL/DL RS including one or more of Common RS (CRS), CSI-RS, SRS, and Demodulation RS (DMRS) may be transmitted in a UL band and bi-directional communication may be performed even in a DL band.

Further, as the usage of a specific band, that is, the usage of specific radio resources can be changed dynamically according to the load state of the system, the present invention can efficiently use radio resources.

In the present invention, the usage of a specific band used in an FDD system may be changed or set independently in terms of a time frequency area, considering the specific band to be a virtual cell or subcarrier (Component Carrier (CC)) to which Carrier Aggregation (CA) is applied.

For example, the method for setting a different usage for a specific band in terms of a time resource area may allow reuse of a UL-DL configuration or signaling of a TDD system, and an eNB may indicate new setting information in terms of a time resource area to a UE by a higher layer signal or a physical layer signal.

That is, the UE may alternately use a DL subframe and a UL subframe configured in two CCs, when performing an HARQ process in a single CC or a single cell in the present invention.

According to the present invention, the usage of a specific band is preferably set in an FDD system in a manner that minimizes effects on a UL/DL HARQ timeline of the legacy FDD system or maximizes the utilization of the UL/DL HARQ process of the legacy FDD system. For example, different UL-DL configurations may be allocated to different bands so that the different bands may serve different purposes at a specific time point. That is, a UL-DL configuration may be set for each band so that a subframe serving a DL purpose may coexist with a subframe serving a UL purpose. In the present invention, it is preferred to set as different usages as possible for different bands at a specific time point. Thus, as many UL frames and DL frames as possible may coexist.

Additionally, a preset time offset may apply between the usages of different bands in terms of time resource areas in the present invention. As the time offset applies, as many DL subframes and UL subframes as possible may coexist at specific time points. An eNB may indicate the time offset to a UE by a higher layer signal or a physical layer signal.

Time offsets may be set independently for UEs, that is, transmission points to which the present invention is applied. Therefore, if time offsets are set for a plurality of UEs, the time offsets may be the same or different. For example, a different time offset may be set for each UE or UE group, a different time offset may be set for each transmission point or transmission point group that participates in cooperative communication, or a different time offset may be set for each cell, CC, cell group, or CC group.

For the convenience of description, the present invention will be described mainly in the context of a UE, transmission point, a cell, or a CC. However, it is apparent that the present invention is also applicable to a UE group, a transmission point group, a cell group, or a CC group.

Further, the usage of radio resources may be set or reset adaptively according to at least one of a different load state, interference state, or channel state of each UE in the present invention. Since the present invention is also applicable to a transmission point, a cell, a CC, a transmission point group, a cell group, or a CC group, a usage may be set effectively for radio resources.

An eNB may indicate at least one of information for applying the present invention or offset setting information to a UE by a preset signal or implicitly according to a predefined rule. For example, the eNB may indicate time offset setting information to the UE by one of a preset physical layer signal, higher layer signal, and system information transmission channel.

While the following description is given centering on a structure for performing an FDD HARQ operation according to the present invention, it is to be clearly understood that the present invention can be extended to a TDD HARQ operation.

Further, the UL-DL configuration of each band may be configured to be valid only during a predetermined time interval according to the present invention. The eNB may indicate information about the predetermined time interval for the UL-DL configuration to the UE by an indicator or the like. For example, the UE may be configured to operate according to a determined UL-DL configuration in a frequency band only for a preset duration or time interval.

Additionally, the UE may receive an indicator indicating fall-back to a preset operation in the legacy FDD or TDD system. For example, the eNB may instruct the UE to switch to a state set prior to setting of a UL-DL configuration for each band, not to perform an HARQ operation according to a determined UL-DL configuration in the legacy FDD system. That is, as information indicating return to the state set prior to the setting of a UL-DL configuration for each band is transmitted to the UE, an operation set in the legacy FDD system may be performed again. Or return to a pre-setting state (e.g., a UL-DL configuration indicated by an SIB) in a band or bands used in the legacy TDD system may be indicated.

Therefore, system load can be handled adaptively by changing an existing usage of radio resources temporarily, when a UL/DL load is changed in the present invention.

Figure 10:
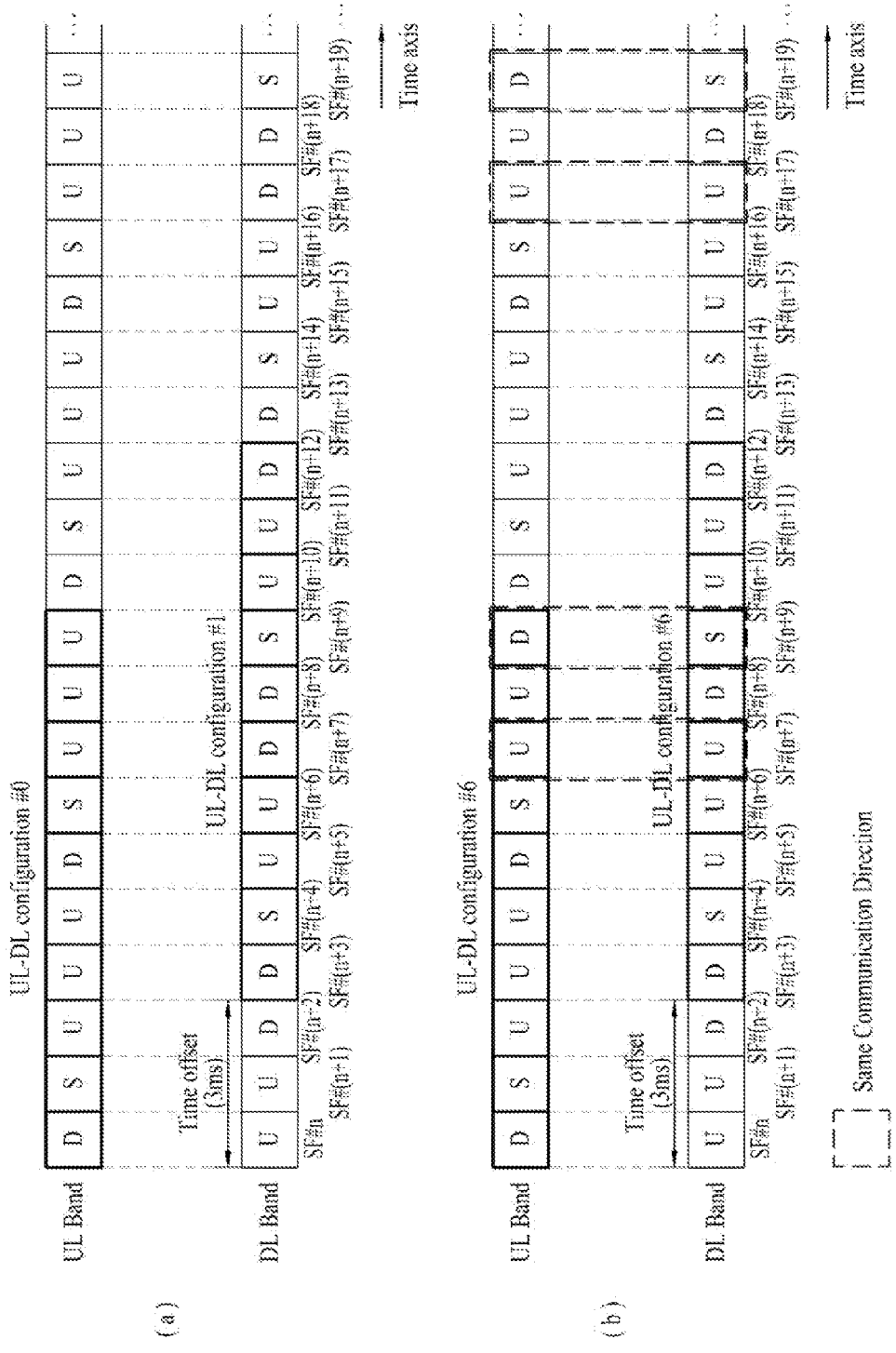
FIG. 10 illustrates a case where different usages are set for different bands in terms of time resource areas according to the present invention.

FIG. 10 illustrates a case where different usages are set for different bands in terms of time resource areas according to the present invention. In FIG. 10, it is assumed that two bands, that is, a DL band and a UL band are used in an FDD system. Referring to FIG. 10, UL-DL configurations configured for the respective bands by a higher layer signal are assumed to be UL-DL configuration #0 and UL-DL configuration #1, respectively in FIG. 10(a) and UL-DL configuration #6 and UL-DL configuration #6 in FIG. 10(b).

It is also assumed in FIG. 10 that a time offset of 3 ms applies between the UL-DL configurations of the bands. FIG. 10(a) illustrates a case where a subframe serving a DL usage and a subframe serving a UL usage always coexist at any time point, whereas FIG. 10(b) illustrates a case where a subframe serving a DL usage and a subframe serving a UL usage do not coexist at some time points. For example, only UL subframes exist in both bands at the time points of SF #(n+7) and SF #(n+17) and only DL subframes exist in both bands at the time points of SF #(n+9) and SF #(n+19) in FIG. 10(b).

The present invention that efficiently performs a UL/DL operation when different usages are set for different bands in terms of time resource areas in an FDD system as described above will be described below. For the convenience of description, two bands, that is, a UL band and a DL band used in an FDD system are assumed. Apparently, the proposed method can be extended to a case where the FDD system uses two or more bands, for example, the FDD system configures two or more bands by CA.

Figure 11:
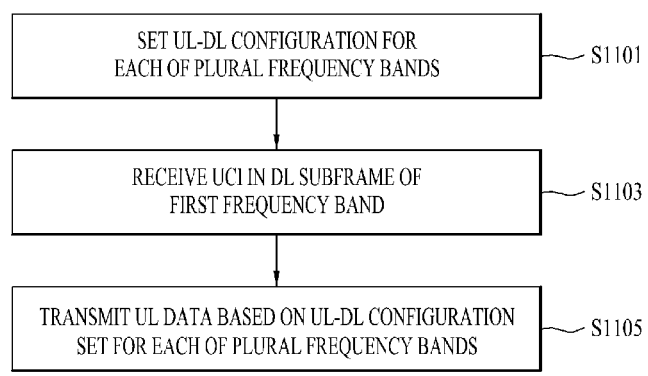
FIG. 11 is a flowchart illustrating a method for transmitting UL data according to an embodiment of the present invention.

FIG. 11 is a flowchart illustrating a method for transmitting UL data according to an embodiment of the present invention.

Referring to FIG. 11, an eNB configures a UL-DL configuration for each of a plurality of frequency bands for a UE (S1101). While the embodiment of the present invention is described in the context of a frequency band, the present invention is also applicable to a virtual cell, a CC, a virtual cell group, or a CC group.

The UE receives UCI in a UL subframe according to a UL-DL configuration configured for a specific frequency band from among the plurality of frequency bands (S1103). According to the present invention, the specific frequency band may be a frequency band used for UL communication or DL communication in the legacy FDD system.

The UE transmits UL data corresponding to the received UCI based on the UL-DL configuration of each of the plurality of frequency bands (S1105). While the above description centers on UL HARQ, the same thing applies to DL HARQ.

According to the present invention, if a UL subframe (e.g. UL SF #(n+4)) linked to a DL subframe (e.g., DL SF #n) exists 4 ms after the DL subframe in a specific frequency band, a UL ACK/NACK transmission/PUSCH (re)transmission for a PDSCH (DL grant)/UL grant/PHICH received in the DL subframe (i.e. DL SF #n) may be scheduled based on a UL/DL HARQ timeline of the legacy FDD system. That is, according to the UL/DL HARQ timeline of the legacy FDD system, upon receipt of a PDSCH (DL grant)/UL grant/PHICH in a DL subframe (e.g. DL SF #n), a UL ACK/NACK transmission/PUSCH (re)transmission associated with the received information may be performed in a UL subframe (e.g. UL SF #(n+4)) linked to the DL subframe (i.e. DL SF #n).

If a DL subframe (e.g., DL SF #(n+4)) linked to a UL subframe (e.g. UL SF #n) exists 4 ms after the UL subframe in a specific frequency band, a UL grant/PHICH reception for a PUSCH (re)transmission in the UL subframe (i.e. UL SF #n) may be scheduled based on the UL/DL HARQ timeline of the legacy FDD system. That is, if a PUSCH is (re)transmitted in a UL subframe (e.g., SF #n) according to the UL/DL HARQ timeline of the legacy FDD system, a UL grant/PHICH associated with the PUSCH (re)transmission may be received in a DL subframe (e.g., SF #(n+4)) linked to the UL subframe.

If a DL subframe (e.g., DL SF #(n–4)) linked to a UL subframe (e.g., UL SF #n) exists 4 ms before the UL subframe in a specific frequency band, a UL grant/PHICH reception for a PUSCH (re)transmission in the UL subframe (i.e., UL SF #n) may be scheduled based on the UL/DL HARQ timeline of the legacy FDD system. That is, a UL grant/PHICH for a PUSCH (re)transmission scheduled in a UL subframe SF #n may be received in a DL subframe SF #(n–4).

If a UL subframe (e.g., UL SF #(n+4)) linked to a DL subframe (e.g., DL SF #n) does not exist 4 ms after the DL subframe in a specific frequency band, a UL ACK/NACK transmission/PUSCH (re)transmission for a PDSCH (DL grant)/UL grant/PHICH received in the DL subframe (i.e., DL SF #n) may be scheduled based on a preset timeline. The preset timeline may be one of an HARQ timeline of an FDD system, an HARQ timeline of a TDD system, and a preset new HARQ timeline.

According to an embodiment of a UL ACK/NACK transmission/PUSCH (re)transmission timeline, if a PDSCH (DL grant)/UL grant/PHICH is received in a DL subframe (e.g., SF #n) of a specific frequency band, a UL ACK/NACK transmission/PUSCH (re)transmission may be performed in a UL subframe (e.g., SF #(n+4) or SF #(n+8)) of another predetermined frequency band, linked to the DL subframe (i.e. SF #n) of the specific frequency band. In another method, the UL ACK/NACL transmission/PUSCH (re)transmission may be performed at a specific time point (i.e., DL SF #(n+8)) in the frequency band in which the PDSCH (DL grant)/UL grant/PHICH has been received (i.e., in DL SF #n)).

If a DL subframe (i.e. DL SF #(n+4)) linked to a UL subframe (e.g., UL SF #n) does not exist 4 ms after the UL subframe in a specific frequency band, a UL grant/PHICH for a PUSCH (re)transmission performed in the UL subframe (i.e., SF #n) may be received in a DL subframe of another frequency band based on a preset timeline. As described above, the preset timeline may be one of an HARQ timeline of an FDD system, an HARQ timeline of a TDD system, and a preset new HARQ timeline.

According to an embodiment of a UL grant/PHICH reception timeline, if a PUSCH is transmitted or retransmitted in a UL subframe (e.g., SF #n) of a specific band, a UL grant/PHICH associated with the PUSCH transmission/retransmission may be received in a DL subframe (e.g., SF #(n+4) or SF #(n+8)) of another predetermined band. In another method, the UL grant/PHICH may be received at a specific time point (i.e., DL SF #(n+8)) in the band in which the PUSCH has been transmitted or retransmitted (i.e., in UL SF #n)).

If a DL subframe (i.e., DL SF #(n−4)) linked to a UL subframe (e.g., UL SF #n) does not exist 4 ms before the UL subframe in a specific frequency band, a UL grant/PHICH for a PUSCH (re)transmission scheduled in the UL subframe (i.e., SF #n) may be received in a DL subframe of another frequency band based on a preset timeline. As described above, the preset timeline may be one of an HARQ timeline of an FDD system, an HARQ timeline of a TDD system, and a preset new HARQ timeline.

That is, according to the present invention, a grant/PHICH for a PUSCH (re)transmission to be performed in a UL subframe (e.g., SF #n) of a specific frequency band may be received in a DL subframe (e.g., DL SF #(n−4) or DL SF #(n−8)) of another preset frequency band. In another method, the UL grant/PHICH may be received at a specific time point (i.e., DL SF #(n−8)) of the frequency band in which the corresponding PUSCH (re)transmission will be performed (i.e., in UL SF #n).

The eNB may indicate information related to a UL ACK/NACK transmission/PUSCH (re)transmission for a PDSCH (DL grant)/UL grant/PHICH received in a DL subframe (e.g., DL SF #n) to the UE by a preset higher layer signal or physical layer signal. The information may include information related to the UL ACK/NACK transmission/PUSCH (re)transmission as well as a UL ACK/NACK transmission/PUSCH (re)transmission timeline. The information related to the UL ACK/NACK transmission/PUSCH (re)transmission includes UL/DL HARQ ID information and at least one of a frequency band, a cell, or a CC in which the UL ACK/NACK transmission/PUSCH (re)transmission is actually performed.

The eNB may indicate the information related to the UL ACK/NACK transmission/PUSCH (re)transmission to the UE at a transmission time of the PDSCH (DL grant)/UL grant/PHICH or a predefined time point (e.g., a specific time point before the transmission of the PDSCH (DL grant)/UL grant/PHICH). For example, if the predefined time point is a specific time point before the transmission of the PDSCH (DL grant)/UL grant/PHICH, the eNB may transmit the above-described information to the UE at the specific time point.

Or if a UL subframe (i.e., UL SF #(n+4)) linked to a DL subframe (e.g., SF #n) does not exist 4 ms after the DL subframe in a specific frequency band, it may be assumed implicitly that a UL ACK/NACK transmission/PUSCH (re)transmission for a PDSCH (DL grant)/UL grant/PHICH received in the DL subframe (i.e., SF #n) is performed in a predetermined frequency band. The predetermined frequency band may be a frequency band in which the PDSCH (DL grant)/UL grant/PHICH is received or any other frequency band. For example, if the predetermined frequency band is a DL grant frequency band, it may be determined implicitly that a UL ACK/NACK for a PDSCH (DL grant) received in the DL subframe (SF #n) is to be transmitted in the DL grant frequency band. In this implicit method, information related to the UL ACK/NACK transmission/PUSCH (re)transmission may be configured not to include information about a frequency band, cell, or CC in which the UL ACK/NACK transmission/PUSCH (re)transmission is actually performed.

The eNB may indicate information related to reception of a UL grant/PHICH for a PUSCH (re)transmission performed in a UL subframe (e.g., UL SF #n) to the UE by a preset higher layer signal or physical layer signal. The information may include UL HARQ ID information related to the corresponding transmission or information about a frequency band, a cell, or a CC in which the UL grant/PHICH is actually received, as well as information about a UL grant/PHICH reception timeline.

Or the eNB may indicate the information related to the reception of the UL grant/PHICH to the UE at a transmission time of the UL grant/PHICH or a predefined time point, before a time of the PUSCH (re)transmission. Or if a DL subframe (i.e., DL SF #(n+4)) linked to a UL subframe (e.g., UL SF #n) does not exist 4 ms after the UL subframe in a specific frequency band, it may be assumed implicitly that a UL grant/PHICH for a UL ACK/NACK transmission/PUSCH (re)transmission performed in the UL subframe (SF #n) is received in a predetermined frequency band.

The predetermined frequency band may be a frequency band in which the PUSCH (re)transmission is performed, or any other frequency band. For example, if the predetermined frequency band is a PUSCH (re) transmission frequency band, it may be determined implicitly that a UL grant for a PUSCH transmitted in the UL subframe (SF #n) is to be received in the PUSCH (re) transmission frequency band. In this implicit method, information related to the UL grant/PHICH reception may be configured not to include information about a frequency band, cell, or CC in which the UL grant/PHICH is actually transmitted.

The eNB may indicate information related to reception of a UL grant/PHICH for a PUSCH (re)transmission performed in a UL subframe (e.g., UL SF #n) to the UE by a preset higher layer signal or physical layer signal. The information may include UL HARQ ID information related to the corresponding transmission or information about a frequency band, a cell, or a CC in which the UL grant/PHICH is actually received, as well as information about a UL grant/PHICH reception timeline.

Or the eNB may indicate the information related to the reception of the UL grant/PHICH to the UE in a closest of previous DL subframes including a DL subframe SF #(n−4), in a closest of previous available DL subframes that do not include the DL subframe SF #(n−4), in a DL standalone subframe, in a conventional DL subframe carrying a UL grant, or at a predefined specific time point. The DL standalone subframe refers to a subframe that does not carry a UL grant for PUSCH transmission.

If a DL subframe (i.e. DL SF #(n−4) linked to a UL subframe (e.g., SF #n) does not exist 4 ms before the UL subframe in a specific frequency band, it may be assumed implicitly that a UL grant/PHICH for a PUSCH (re)transmission scheduled in the UL subframe (i.e., SF #n) is received in a predetermined frequency band.

The predetermined band may be a PUSCH (re)transmission frequency band or any other frequency band. For example, if the predetermined band is a PUSCH (re)transmission frequency band, it may be determined implicitly that a UL grant for a PUSCH to be transmitted in a UL subframe (e.g., SF #n) is received in the PUSCH (re) transmission frequency band. In this implicit method, information related to the UL grant/PHICH reception may be configured not to include information about a frequency band, cell, or CC in which the UL grant/PHICH is actually transmitted.

Figure 12:
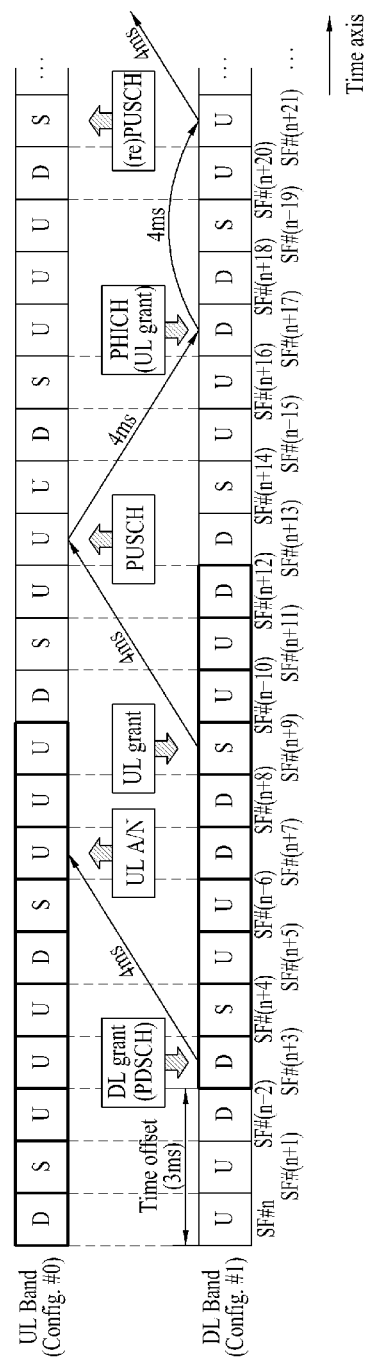
FIGS. 12 and 13 illustrate UL/DL HARQ operations according to the present invention.
Figure 13:
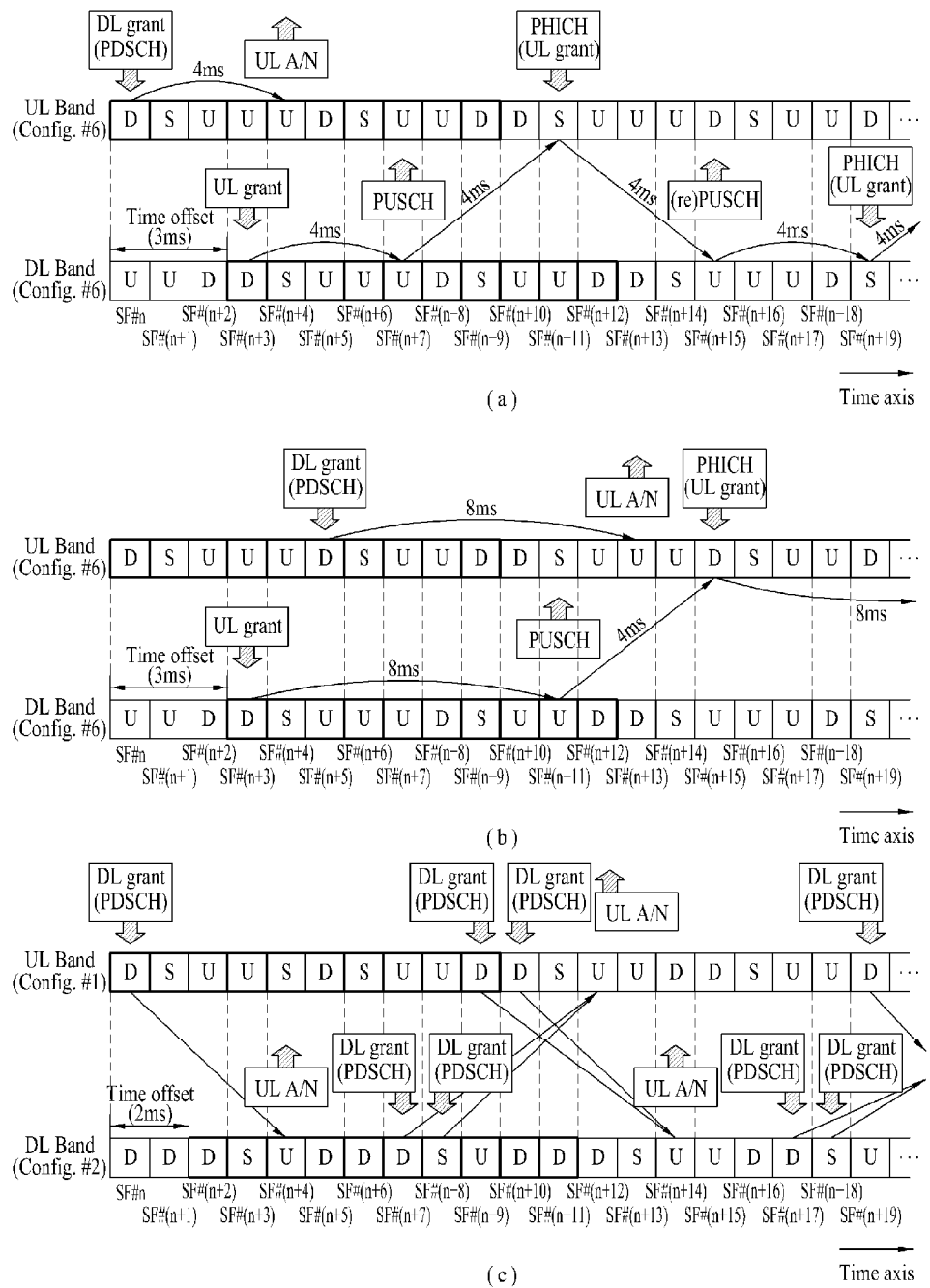

FIGS. 12 and 13 illustrate UL/DL HARQ operations according to embodiments of the present invention. In FIGS. 12 and 13, the same UL-DL configuration for each frequency band and the same time offset (e.g., 3 ms) as those illustrated in FIG. 10 are assumed. It is also assumed that in the absence of a UL subframe (e.g., UL SF #(n+4)) linked to a DL subframe (e.g., DL SF #n) or a DL subframe (e.g., DL SF #(n+4)) linked to a UL subframe (e.g., UL SF #n) in a specific frequency band, an eNB transmits information about a frequency band for a UL ACK/NACK transmission/PUSCH (re)transmission or a UL grant/PHICH reception to a UE by a physical layer signal.

FIG. 12 illustrates a case where the UL/DL HARQ timeline of the legacy FDD system may be maintained because a subframe used for DL transmission and a subframe used for UL transmission always coexist at any time point. That is, since a UL subframe (SF #(n+4)) linked to a DL subframe (SF #n) of a specific frequency band or a DL subframe (SF #(n+4)) linked to a UL subframe (SF #n) of a specific frequency band always exist according to the UL/DL HARQ timeline, the present invention may be implemented, while maintaining the UL/DL HARQ timeline of the legacy FDD system.

In contrast, a subframe used for DL transmission does not coexist with a subframe used for UL transmission at some time points in FIG. 13. Therefore, the UL/DL HARQ timeline of the legacy FDD system may not be maintained. Accordingly, as much of the UL/DL HARQ timeline of the legacy FDD system as possible may be maintained according to the afore-described present invention.

FIG. 13(a) illustrates a case where the UL/DL HARQ timeline of the legacy FDD system may be maintained. Referring to FIG. 13(a), if a PDSCH carrying a DL grant is received in a DL subframe SF #n of a UL band of the legacy FDD system in DL HARQ, a UL ACK/NACK may be transmitted in response to the PDSCH in a linked UL subframe SF #(n+4) of the UL band. However, if a PUSCH is transmitted in a UL subframe SF #(n+7) of a DL band of the legacy FDD system, a DL subframe SF #(n+11) linked to the UL subframe SF #(n+7) does not exist in the DL band. Then a UL grant/PHICH may be received in a DL subframe of another band (i.e., a special subframe SF #(n+11) of the UL band).

FIG. 13(b) illustrates a case where a UL/DL HARQ timeline modified based on the present invention is used. That is, if a DL subframe linked to a UL subframe does not exist 4 ms after the UL subframe or a UL subframe linked to a DL subframe does not exist 4 ms after the DL subframe, it is assumed that a subframe SF #(n+8) of a corresponding band is supposed to be used.

Referring to FIG. 13(b), if a PDSCH carrying a DL grant is received in a DL subframe SF #(n+5) of the UL band of the legacy FDD system in DL HARQ and a UL subframe SF #(n+9) linked to the DL subframe SF #(n+5) does not exist, a UL ACK/NACK may be transmitted in a UL subframe SF #(n+13) of the UL band. However, if a PUSCH is transmitted in a UL subframe SF #(n+11) of the DL band of the legacy FDD system and a DL subframe SF #(n+15) linked to the UL subframe SF #(n+11) does not exist in the DL band, a UL grant/PHICH may be received in a DL subframe of another band (i.e., a DL subframe SF #(n+15) of the UL band).

FIG. 13(c) illustrates a predetermined UL/DL HARQ timeline of a TDD system other than an HARQ timeline of an FDD system. Specifically, FIG. 13(c) illustrates a case where a UL/DL HARQ operation is performed in a predetermined UL/DL HARQ timeline of a TDD system based on UL-DL configuration #3 (i.e. DSUUUDDDDD). FIG. 13(c) is based on the assumption that UL-DL configurations configured for respective bands as signaled by a higher layer signal are UL-DL configuration #1 and UL-DL configuration #2 and a predetermined time offset of 2 ms is applied between the UL-DL configurations of the respective bands.

Referring to FIG. 13(c), although a PDSCH carrying a DL grant is received in a subframe SF #n of a UL band according to UL-DL configuration #1, a UL ACK/NACK for the DL grant should be transmitted in a subframe SF #(n+4) according to UL-DL configuration #3. Thus, the UL ACK/NACK is transmitted in a DL band having a UL subframe at the corresponding time point. If a PDSCH carrying a DL grant is received in subframes SF #(n+7) and SF #(n+8) of the DL band, a closest subframe that comes 4 ms later is a subframe SF #(n+12) according to UL-DL configuration #3. Thus, a UL ACK/NACK is transmitted in a UL subframe of the UL band at this time point. Likewise, if a PDSCH carrying a DL grant is received in subframes SF #(n+9) and SF #(n+10) of the UL band, a closest subframe that comes 4 ms later is a subframe SF #(n+14) according to UL-DL configuration #3. Thus, a UL ACK/NACK is transmitted in a UL subframe of the DL band at this time point.

In the above-described methods of the present invention, a specific UL/DL HARQ process is performed alternately in different bands or with hopping between the different bands. While it has been described that a UL/DL HARQ process alternates between different bands for the convenience of description, the UL/DL HARQ process may be performed alternately between different cells or CCs or with hopping between different cells or CCs.

In another example of the present invention, the usage of a specific band used in an FDD system may be set independently in terms of a time resource area, with the specific band regarded as a virtual cell or CC to which CA is applied.

For example, the usage of a specific band may be (re)configured based on a predetermined length or period and may be fixedly set to a common usage. For example, the specific band may be configured independently for DL subframes, special subframes, or UL subframes.

FIGS. 14 and 15 illustrate cases where a UL/DL HARQ operation is performed based on a predetermined HARQ timeline when a specific band is fixedly configured for a common usage.

According to the present invention, to perform a UL/DL HARQ operation in a specific band based on an HARQ timeline of a legacy system to which the specific band belongs, a DL subframe and a UL subframe that support the HARQ timeline of the legacy system should exist in the specific band. That is, at least one of a UL subframe linked to a DL subframe corresponding to a specific time point or a DL subframe linked to a UL subframe corresponding to a specific time point should exist. For example, a UL subframe linked to a DL subframe corresponding to a specific time point may be one of a transmission time of a UL ACK/NACK for reception of a DL grant (PDSCH) or a time of PUSCH (re)transmission for reception of a DL grant/PHICH. Also, the UL subframe linked to the DL subframe corresponding to the specific time point may be a reception time of a UL grant/PHICH for a PUSCH (re)transmission.

In the absence of a DL subframe and a UL subframe that support the HARQ timeline of the legacy system in the corresponding band, a UL/DL HARQ operation may be performed based on an additional preset HARQ timeline.

For example, the additional preset HARQ timeline may be defined as one of a UL/DL HARQ timeline of an FDD system, a UL/DL HARQ timeline of a TDD system, and a new UL/DL HARQ timeline. Therefore, if the present invention is implemented based on the additional preset HARQ timeline, a specific UL/DL HARQ process may be performed alternately between different bands or with hopping between different bands. It is also apparent that the specific UL/DL HARQ process may be performed alternately between different cells or CCs or with hopping between different cells or CCs.

FIG. 14 illustrates 2-cell situations in an FDD system. While the following description is given mainly in the context of two cells for the convenience of description, the same thing applies to a situation in which two bands or CCs are configured. With reference to FIG. 14, cases where a preset HARQ timeline is set as a UL/DL HARQ timeline for an FDD system will be described.

FIG. 14(a) illustrates a DL HARQ operation based on a preset HARQ timeline. Referring to FIG. 14(a), if cell #0 is configured for UL and cell #1 is configured for UL, a UL ACK/NACK for a PUSCH (DL grant) received in cell #1 may be transmitted in cell #0 in the present invention. Thus, the DL HARQ operation may be performed alternately between different cells.

Similarly, FIG. 14(b) illustrates a UL HARQ operation based on a preset HARQ timeline. Referring to FIG. 14(b), if cell #0 is configured for UL and cell #1 is configured for UL, a PUSCH for a UL grant received in cell #1 may be transmitted in cell #0 in the present invention. Thus, the UL HARQ operation may be performed alternately between different cells.

FIG. 15 illustrates 2-cell situations in a TDD system. While the following description is given mainly in the context of two cells for the convenience of description, the same thing applies to a situation in which two bands or CCs are configured. With reference to FIG. 15, cases where a preset HARQ timeline is set as a UL/DL HARQ timeline for a TDD system will be described. For the convenience of description, the preset HARQ timeline complies with UL-DL configuration #1 (i.e. DSUUDDSUUD).

FIG. 15(a) illustrates a case where an HARQ operation is performed based on a preset DL HARQ timeline. Referring to FIG. 15(a), if cell #0 is configured for UL and cell #1 is configured for UL, a UL ACK/NACK for a DL grant (PUSCH) received in cell #1 may be transmitted in a closest UL subframe 4 ms after the PUSCH reception in cell #0. For example, if a DL grant (PDSCH) is received in subframes SF #n and SF #(n+1), a UL ACK/NACK is transmitted in a closest UL subframe SF #(n+7) 4 ms after the reception of the DL grant (PDSCH) according to UL-DL configuration #1. Likewise, if a DL grant (PDSCH) is received in a subframe SF #(n+4), a UL ACK/NACK is transmitted in a closest UL subframe SF #(n+8) 4 ms after the reception of the DL grant (PDSCH) according to UL-DL configuration #1.

FIG. 15(b) illustrates a case where an HARQ operation is performed based on a preset UL HARQ timeline. Referring to FIG. 15(b), if cell #0 is configured for UL and cell #1 is configured for UL, a PUSCH for a UL grant/PHICH received in cell #1 is transmitted in a closest UL subframe 4 ms after the PUSCH reception in cell #0, as in FIG. 15(a). For example, if a UL grant/PHICH is received in a subframe SF #(n+1), a PUSCH is transmitted in a closest UL subframe SF #(n+7) 4 ms after the reception of the UL grant/PHICH according to UL-DL configuration #1. Likewise, if a UL grant/PHICH is received in a subframe SF #(n+4), a PUSCH is transmitted in a closest UL subframe SF #(n+8) 4 ms after the reception of the UL grant/PHICH according to UL-DL configuration #1.

As described above, specific UL/DL HARQ processes are performed alternately between different bands based on a preset HARQ timeline in FIGS. 14 and 15. That is, specific UL/DL HARQ processes are performed alternately between different bands based on a preset HARQ timeline, in the same manner as illustrated in FIGS. 12 and 13. A preset HARQ timeline of a TDD system other than the HARQ timeline of the legacy FDD system to which a corresponding band belongs may be used. Further, the specific UL/DL HARQ processes may be performed alternately between different cells or CCs or with hopping between different cells or CCs. Similarly, a preset HARQ timeline of a TDD system other than the HARQ timeline of the legacy FDD system to which a corresponding cell or CC belongs may be used.

According to the present invention, additionally, the usage of a specific band may be set to a combination of DL subframe and special subframe. For example, the usage of a DL band may be set to a combination of DL subframe and special subframe (i.e., a subframe including DwPTS, GP, and UpPTS).

Accordingly, as an eNB allows a UE to transmit an SRS even in a specific band configured for DL in a massive MIMO environment with multiple antennas, the complexity of DL channel estimation and reporting of the UE may be mitigated. That is, since an SRS is transmitted in the UpPTS of a special subframe configured in a DL band, the complexity of DL channel estimation and reporting may be reduced based on channel reciprocity.

For example, the UE may transmit an SRS in a special subframe (i.e., UpPTS) in a specific band configured for DL and the eNB may transmit information about a transmission period, transmission time, and allocated resources of the SRS to the UE by a preset higher layer signal or physical layer signal.

In the present invention, the SRS may be transmitted periodically or aperiodically. For example, aperiodic SRS transmission may be performed based on a triggering message transmitted on a physical control channel.

Further, the SRS transmission method of the present invention can be extended to a case where the usage of a specific band (e.g., a DL band) is set to a combination of DL subframe, UL subframe, and special subframe.

Figure 16:
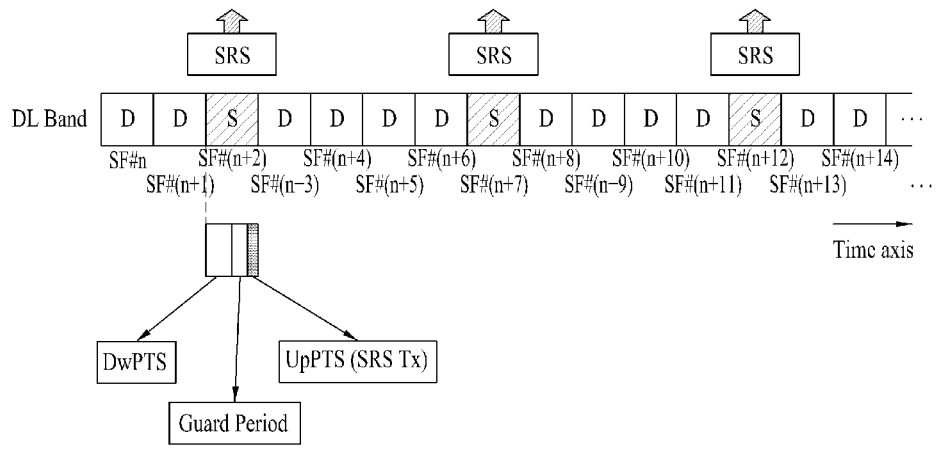
FIG. 16 illustrates an operation for transmitting a Sounding Reference Signal (SRS) in a special subframe (i.e. an Uplink Pilot Time Slot (UpPTS)) when the usage of a DL band is set to a combination of DL subframe and special subframe according to the present invention.

FIG. 16 illustrates an operation for transmitting an SRS in a special subframe (i.e., UpPTS), when the usage of a DL band is set to a combination of DL subframe and special subframe according to an embodiment of the present invention. Referring to FIG. 16, an SRS is transmitted every 5 ms indicated by a higher layer signal. The SRS may be transmitted in the UpPTS of a special subframe.

The foregoing embodiments of the present invention can be extended to a case where UE-eNB communication or UE-UE communication is conducted in an extension carrier under a CA environment.

Also, the proposed methods can be extended to a case where a specific UE receives control information/data information from a macro eNB through a Relay Node (RN) or a predetermined UE (i.e., UE relaying or Device-to-Device (D2D) communication).

Additionally, the present invention can be extended to a case where a preset usage of radio resources is changed dynamically according to system load.

Accordingly, the present invention can be extended to a case where the usage of a corresponding band is changed in terms of a time resource area using a band of an FDD system or bands of a TDD system or a case where bands of TDD and FDD systems are aggregated by CA. The present invention is also applicable to a case where the usage of a corresponding band is changed in terms of a time resource area using a cell or CC of a specific system, not a band of the specific system. The present invention can be extended to a case where the usage of a corresponding band is changed in terms of a time resource area by aggregating cells or CCs of TDD and FDD systems by CA.

Figure 17:
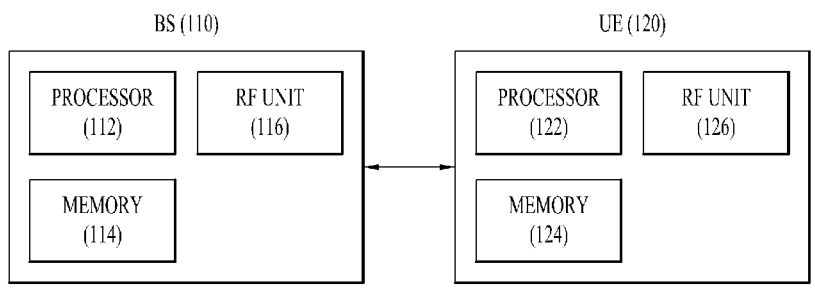
FIG. 17 is a block diagram of a Base Station (BS) and a User Equipment (UE) which are applicable to embodiments of the present invention.

FIG. 17 is a block diagram of a BS and a UE which are applicable to embodiments of the present invention. If RNs are included in a wireless communication system, backhaul link communication is performed between an eNB and an RN and access link communication is performed between an RN and a UE. Therefore, the BS or the UE illustrated in FIG. 17 may be replaced with an RN under circumstances.

Referring to FIG. 17, a wireless communication system includes a BS 110 and a UE 120. The BS 110 includes a processor 112, a memory 114, and a Radio Frequency (RF) unit 116. The processor 112 is configured to perform the proposed procedures and/or methods of the present invention. The memory 114 is connected to the processor 112 and stores various types of information related to operations of the processor 112. The RF unit 116 is connected to the processor 112 and transmits and/or receives wireless signals. The UE 120 includes a processor 122, a memory 124, and an RF unit 126. The processor 122 may be configured to perform the proposed procedures and/or methods of the present invention. The memory 124 is connected to the processor 122 and stores various types of information related to operations of the processor 122. The RF unit 126 is connected to the processor 122 and transmits and/or receives wireless signals. The BS 110 and/or the UE 120 may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for transmitting UL data information in a wireless communication system and the apparatus for the same have been described in the context of a 3GPP LTE system, they are applicable to many other wireless access systems than the 3GPP LTE system.

The invention claimed is:

1. A method for transmitting uplink data using Hybrid Automatic Repeat and reQuest (HARD) by a User Equipment (UE) in a wireless communication system, the method comprising:
setting a first Uplink-Downlink (UL-DL) configuration for a first frequency band and a second UL-DL configuration for a second frequency band;
receiving uplink control information in a downlink subframe of the first frequency band; and
transmitting uplink data corresponding to the uplink control information in a specific uplink subframe of the second frequency band linked to the downlink subframe of the first frequency band according to the second UL-DL configuration, when an uplink subframe, which has a subframe number corresponding to the downlink subframe according to the first UL-DL configuration, does not exist on the first frequency band within a predetermined time after the downlink subframe.

2. The method according to claim 1, wherein the specific uplink subframe is the first uplink subframe the predetermined time after a reception time of the uplink control information among subframes of the first and second frequency bands.

3. The method according to claim 1, wherein the first and second frequency bands are different on a single component carrier.

4. The method according to claim 1, wherein one of the first and second frequency bands is a frequency band for uplink communication and the other frequency band is a frequency band for downlink communication.

5. The method according to claim 1, wherein a time offset applies between the first and second UL-DL configurations.

6. The method according to claim 5, wherein the time offset is received by one of a physical layer signal, a higher layer signal, and a system information transmission channel.

7. The method according to claim 1, wherein the predetermined time is 4 ms.

8. The method according to claim 1, further comprising receiving control information corresponding to the transmitted uplink data in a specific downlink subframe linked to the specific uplink subframe based on the first and second UL-DL configurations.

9. The method according to claim 8, wherein the specific downlink subframe is the first downlink subframe a predetermined time after a transmission time of the uplink data among subframes of the first and second frequency bands.

10. The method according to claim 1, further comprising receiving information related to transmission of the specific uplink subframe by a higher layer signal or a physical layer signal.

11. The method according to claim 1, wherein the first and second UL-DL configurations are set to be valid only during a predetermined time interval.

12. The method according to claim 11, wherein information about the predetermined time interval is received by a physical layer signal or a higher layer signal.

13. A User Equipment (UE) for transmitting uplink data using Hybrid Automatic Repeat and reQuest (HARD) in a wireless communication system, the UE comprising:
- a Radio Frequency (RF) unit; and
- a processor,
- wherein the processor is configured to set a first Uplink-Downlink (UL-DL) configuration for a first frequency band and a second UL-DL configuration for a second frequency band, receive uplink control information in a downlink subframe of the first frequency band, and transmit uplink data corresponding to the uplink control information in a specific uplink subframe of the second frequency band linked to the downlink subframe of the first frequency band according to the second UL-DL configuration, when an uplink subframe, which has a subframe number corresponding to the downlink subframe according to the first UL-DL configuration, does not exist on the first frequency band within a predetermined time after the downlink subframe.

* * * * *